United States Patent Office 3,481,188
Patented Dec. 2, 1969

3,481,188
MEASURING DEVICE OF LOAD CAPACITY
OF THE EARTH LAYER
Hiroshi Mori, 510 1-chome, Iwabushi-cho,
Kitaku, Tokyo, Japan
Filed Mar. 10, 1967, Ser. No. 622,156
Int. Cl. G01n 3/00
U.S. Cl. 73—84                                           1 Claim

ABSTRACT OF THE DISCLOSURE

A hollow insertion rod supporting a cylindrical member which is provided at its lower end with a hydraulically actuated load plate. The insertion rod contains a displacement measuring rod connected to the load plate. A shearing ring, located in a recess in the cylindrical member, is rotatable with the insertion rod relative to the cylindrical member and to the displacement measuring rod. Inflatable ground anchoring means are provided on the cylindrical member above the shearing ring.

---

The present invention relates to a device for measuring the load bearing capacity of the ground at a given depth.

Conventional devices are known for measuring the load bearing capacity of the ground and the frictional resistance factor between a foundation and the surrounding earth. Such devices usually employ a double tube or rod arrangement, and while they are useful in obtaining a general appraisal of the bearing capacity of the ground, they have the following shortcomings:

(1) Settlement of the loading plate or conical point is measured at the top of the inner rod. This rod, however, is deformed under load, and thus a reading of the settlement taken at the top of the rod includes an error arising from deformation of the rod, and such an error must be compensated for in order to obtain an accurate value.

(2) The frictional resistance of the earth is measured by pulling the outer tube or rod upwardly or by pushing it downwardly, and the force applied to the outer rod works against the frictional resistance along the entire length of the rod, with the result that stress arising from the applied force is greater at the top of the rod than at its bottom portion. Consequently, the relationship between the frictional resistance and the displacement of the rod is not necessarily in accordance with the actual characteristics of the earth.

(3) Although the double tube or rod arrangement can conduct a measurement at a single depth, it is extremely difficult to use this arrangement for conducting a number of measurements at different depths.

The principal object of the present invention is to eliminate the aforementioned disadvantages of conventional double tube or rod testing devices, and to provide a simple device which is capable of accurately measuring the ground characteristics.

Other objects and features of the present invention will become more fully understood by reference to the following detailed description of a preferred embodiment thereof, taken in conjunction with the accompanying drawing wherein.

Figure 1:
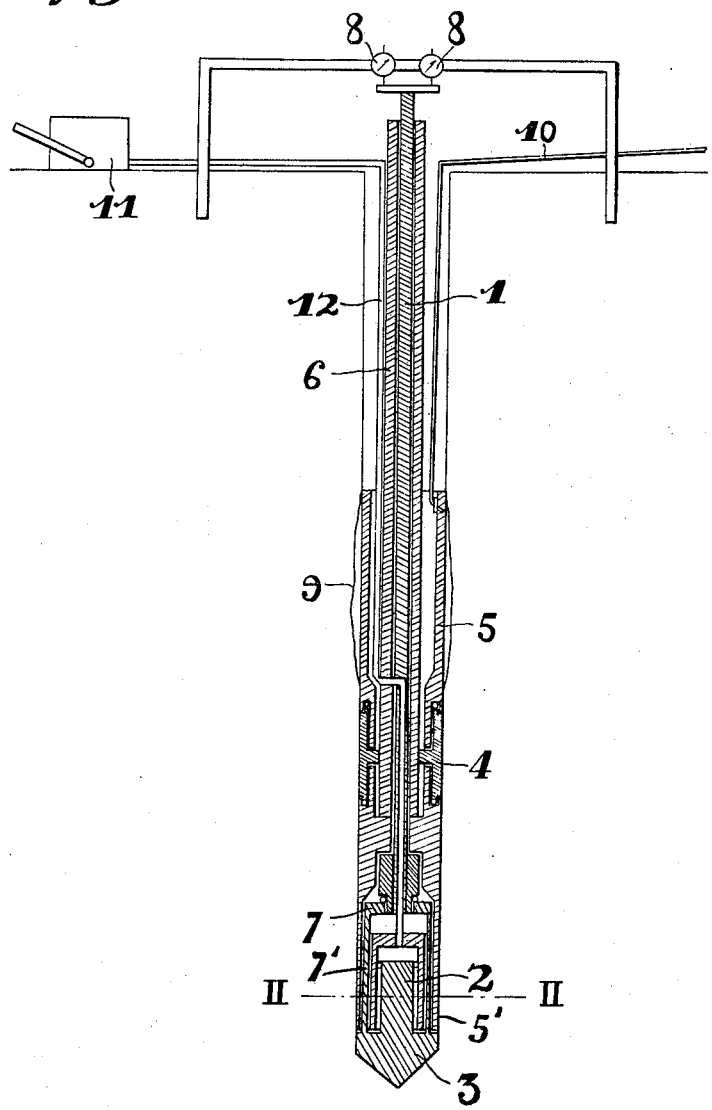
FIGURE 1 is a cross sectional view of one embodiment according to the invention.
Figure 2:
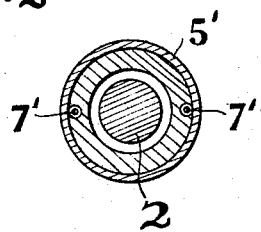
FIGURE 2 is a cross section of line II—II in FIG. 1.

Referring now to the accompanying drawings in detail, a cone-shaped load plate 3 which is forced into the earth is operated by a hydraulic piston 2, formed integrally with the load plate. The piston 2 is located below the lower end of a displacement measuring rod 1 which is disposed axially in a tubular insertion rod 6, and the latter is provided on the outside thereof with a cylindrical member 5. The member 5 is recessed to accommodate an annular shearing ring 4 which has the same outside diameter as the member 5 and is rotatable with the insertion rod 6 relative to the cylindrical member 5. The insertion rod 6 is utilized for driving the load plate 3 to the test level, and measurement of the frictional resistance factor of the earth is accomplished by rotating, from above ground, the rod 6 with the ring 4 relative to the member 5.

The lower end of the displacement measuring rod 1 engages a connector 7 which includes a pair of downwardly extending rod-shaped portions 7'. These extend slidably through the wall thickness of a hydraulic cylinder 5' which is constituted by the lower end portion of the cylindrical member 5 for accommodating the aforementioned piston 2, and the lower ends of the connector portions 7' are connected to the load plate 3. Thus, the connector 7 serves to transmit the degree of settlement to the displacement measuring rod 1, and since the insertion rod 6 rather than the rod 1 is used to drive the load plate 3 into the earth, the displacement of the rod 1, as indicated by dial gauges 8, may be utilized to accurately measure settlement of the load plate 3.

Further, since the insertion rod 6 is rotatable with the shearing ring 4, the upper end of the rod 6 may be used to obtain an accurate measurement of the angle of rotation of the shearing ring relative to the member 5, since the displacement rod 1 is not subjected to twist, as is the rod 6 in transmitting rotational force to the ring 4. The cylindrical member 5 is anchored in the ground by an inflatable membrane 9 into which compressed air may be delivered through a line 10. A hydraulic pump 11 delivers oil under pressure through a line 12 for actuation of the piston 2 in the cylinder 5'.

The invention will now be described in terms of a working example with reference to FIG. 3. With a maximum pressure of 140 kg./cm.² in the hydraulic cylinder 5', when the load plate 3 was caused to settle under a pressure of 100 kg./cm.², the resultant upward reaction was found to be 8 tons. This upward force was sustained by the inflated membrane 9 on the cylindrical member 5 with a 10 cm. outside diameter. When the upward force is 8 tons and the air pressure within the inflated membrane 9 is 10 kg./cm.², a membrane 1 meter in length is sufficient to sustain the upward force. The underground anchor 9 eliminates the necessity for an anchor above ground and also eliminates the danger of the insertion rod 6 buckling.

In testing, a hole slightly larger than the diameter of the device was first bored to a depth one meter less than the depth to be tested. The load plate 3 was then driven into the earth by impacting the upper end of the insertion rod 6, and the rod 6 was then rotated with the shearing ring 4, and the angle of rotation was measured with respect to the upper end of the displacement measuring rod 1. Compressed air was then delivered through the line 10 into the membrane 9 to inflate and expand the same against the surrounding ground, and the hydraulic pump 11 was operated to exert fluid pressure on the piston 2. Readings were taken from both a pressure gauge (not shown) on the pump 11, and from the dial gauges 8 at the upper end of the rod 1.

Figure 3:
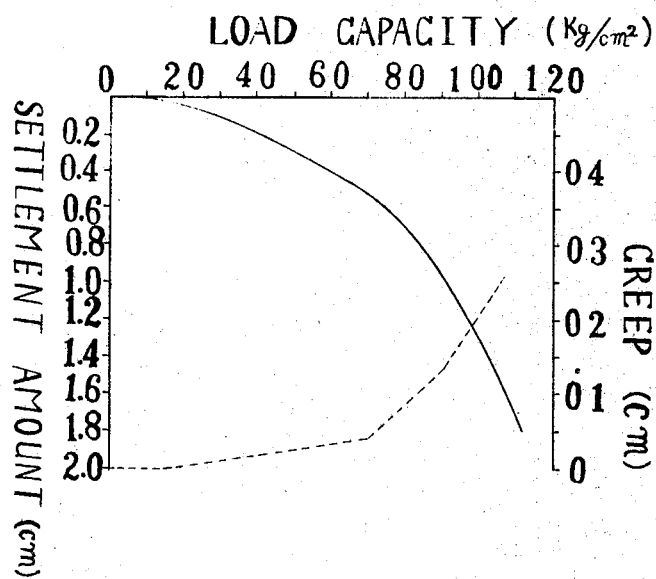
FIGURE 3 is a measuring diagram.

FIG. 3 shows the result of a test utilizing a maximum pressure of approximately 100 kg./cm.². The solid line shows the relationship between the pressure and settlement, while the dotted line shows the relationship between "creep" and pressure. From this "creep" and pressure can be seen to be in a linear relationship and the yield pressure is found to be 70 kg./cm.². Application of pressure in this test was done by increasing the pressure by 5 kg./cm.² every 16 minutes and the "creep" during each 16-minute interval was measured precisely. After the device is withdrawn, testing may be repeated in the same manner as already described.

What I claimed is:

1. A device for measuring the load bearing capacity of the ground, comprising in combination, a hollow insertion rod, a cylindrical member supported on said insertion rod, a hydraulically actuated load plate provided at the lower end of said cylindrical member, a displacement measuring rod disposed axially in said insertion rod and connected at its lower end to said load plate, an annular shearing ring positioned in a recess in said cylindrical member and having the same diameter as the cylindrical member, said ring being rotatable with said insertion rod relative to the cylindrical member and to said displacement measuring rod, and inflatable ground anchoring means provided on said cylindrical member above said shearing ring.

References Cited

UNITED STATES PATENTS

| | | | |
|---|---|---|---|
| 2,603,967 | 7/1952 | Carlson | 73—84 |
| 2,640,351 | 6/1953 | Jourdain | 73—84 |

RICHARD C. QUEISSER, Primary Examiner

J. K. LUNSFORD, Assistant Examiner